United States Patent
Read et al.

(10) Patent No.: US 8,567,650 B2
(45) Date of Patent: Oct. 29, 2013

(54) TRUCK BOX ASSEMBLY

(75) Inventors: Brian Angus Read, Cobourg (CA);
Brian Bruce Clarkson, Cobourg (CA);
Michael Merril Springer, Baltimore
(CA); Keith Alan Armstrong,
Bowmanville (CA)

(73) Assignee: 1541689 Ontario Inc., Cobourg (CA)

( * ) Notice: Subject to any disclaimer, the term of this patent is extended or adjusted under 35 U.S.C. 154(b) by 250 days.

(21) Appl. No.: 13/032,044

(22) Filed: Feb. 22, 2011

(65) Prior Publication Data

US 2011/0204110 A1    Aug. 25, 2011

Related U.S. Application Data

(60) Provisional application No. 61/308,065, filed on Feb. 25, 2010.

(51) Int. Cl.
*B60R 7/00* (2006.01)

(52) U.S. Cl.
USPC ........... 224/404; 224/547; 224/557; 224/561; 224/565; 224/543; 296/37.6

(58) Field of Classification Search
USPC ......... 224/402–405, 545, 547, 555, 557–560, 224/561, 564–566, 482, 527, 543; 296/37.6; 248/674, 680, 309.1
See application file for complete search history.

(56) References Cited

U.S. PATENT DOCUMENTS

| | | | |
|---|---|---|---|
| 1,353,853 A * | 9/1920 | Sandberg | 248/208 |
| 1,778,771 A * | 10/1930 | Pritchard | 224/482 |
| 3,940,009 A | 2/1976 | Szeles | |
| 4,728,017 A | 3/1988 | Mullican | |
| 4,751,981 A * | 6/1988 | Mitchell et al. | 182/127 |
| 5,419,476 A * | 5/1995 | White | 224/404 |
| D369,342 S | 4/1996 | Williams | |
| 5,601,206 A | 2/1997 | Haas et al. | |
| 5,605,264 A * | 2/1997 | Neal | 224/404 |
| 5,685,467 A | 11/1997 | Niemi et al. | |
| 5,875,948 A | 3/1999 | Sadler | |
| 5,924,615 A | 7/1999 | McGarrah | |
| 5,947,356 A | 9/1999 | Delong | |
| 6,082,804 A * | 7/2000 | Schlachter | 296/37.6 |
| 6,213,333 B1 | 4/2001 | Icard | |
| 6,273,289 B1 | 8/2001 | Bowman | |
| 6,561,399 B1 | 5/2003 | Loosbrock | |
| 6,796,539 B2 | 9/2004 | Tilton | |
| 7,055,724 B2 | 6/2006 | Farentinos | |
| 2005/0017038 A1 | 1/2005 | Johnson | |

* cited by examiner

Primary Examiner — Nathan J Newhouse
Assistant Examiner — Scott McNurlen
(74) Attorney, Agent, or Firm — Gifford, Krass, Sprinkle, Anderson & Citkowski, P.C.; Douglas L. Wathen

(57) ABSTRACT

A storage box and a supporting bracket assembly are provided for use in the bed of a pickup style truck. The storage box has a base with a bottom and a plurality of side walls. The bracket assembly includes a box engaging portion, a hook portion and an adjustable support leg. The box and bracket have an installed position wherein the hook portion engages the upper rail of a bed of a pickup style bed, the outer end of the adjustable support leg engages a wall extending downwardly from the upper rail of the bed and the storage box is supported on the bracket assembly adjacent the wall of the bed.

8 Claims, 5 Drawing Sheets

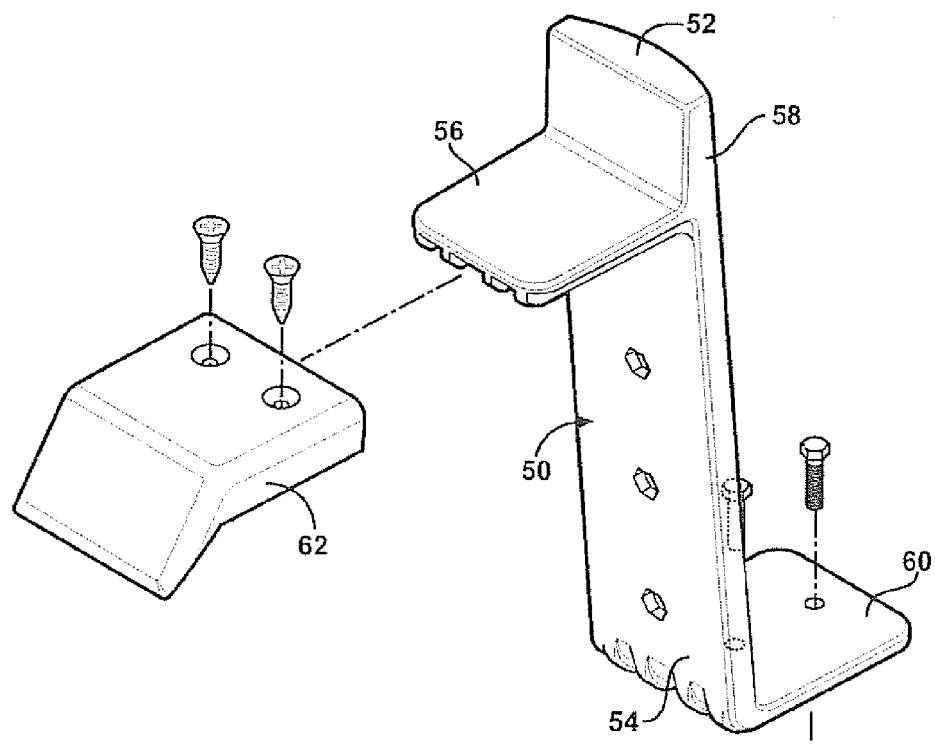
FIG. 4
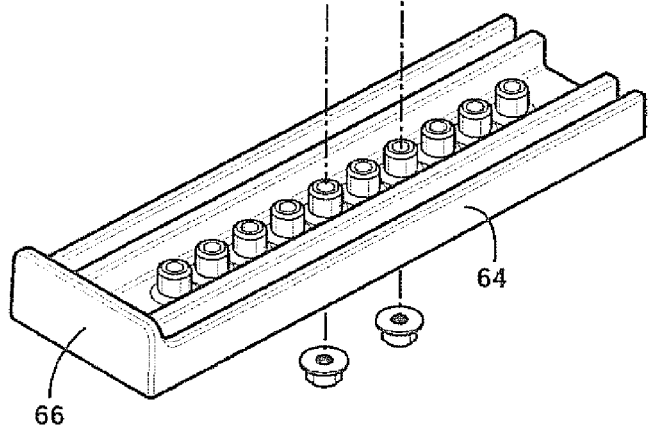

TRUCK BOX ASSEMBLY

REFERENCE TO RELATED APPLICATION

This Utility Patent Application claims priority from U.S. Provisional Patent Application Ser. No. 61/308,065, filed Feb. 25, 2010, the entire content of which is incorporated herein in its entirety.

FIELD OF THE INVENTION

The present invention relates generally to storage devices for use with pickup style trucks.

BACKGROUND OF THE INVENTION

There are a wide variety of storage devices available for improving the storage capabilities of a pickup style truck. For example, truck boxes are available which span the bed of the pickup truck, side to side, towards the front wall of the bed. These boxes typically have locking lids and an interior storage area for tools and other objects. Also available are storage containers that sit on the floor of the truck bed and which may be fastened to the bed in various ways. An example is shown in U.S. Pat. No. 4,728,017 to Mullican.

There remains a need far storage boxes designed for use with or in the bed of a pickup style truck.

SUMMARY OF THE INVENTION

The present invention provides a storage box and a supporting bracket assembly for use in the bed of a pickup style truck. In one embodiment, the storage box has a base with a bottom and a plurality of side walls extending upwardly from the bottom to an upper edge. The box also has a lid with a top and a lower edge configured to fit against the upper edge of the base. The bracket assembly includes a box engaging portion, a hook portion and an adjustable support leg. The box engaging portion has an upper end and a lower end, and a first side and a second side. The box engaging portion is connectable to a side wall of the storage box base such that the first side is disposed towards the side wall of the storage box. The hook portion extends from the second side of the box engaging portion and is configured to engage the upper rail of a bed of a pickup style truck. The adjustable support leg extends from the second side of the box engaging portion and has an outer end. The adjustable support leg is adjustable so as to adjust the distance between the outer end and the box engaging portion. The box and bracket have an installed position wherein the hook portion engages the upper rail of a bed of a pickup style bed, the outer end of the adjustable support leg engages a wall extending downwardly from the upper rail of the bed and the storage box is supported on the bracket assembly adjacent the wall of the bed.

In some embodiments, the storage box has a rim at the upper end, the rim having an underside with at least one opening defined therein. The upper end of the box engaging portion is disposed in the at least one opening when the combination is in the installed position.

In some embodiments, the invention further includes a second bracket assembly with features matching the bracket assembly.

In some embodiments, the hook portion extends from the box engaging portion near the upper end of the box engaging portion. In some versions, the hook portion is spaced from the upper end of the box engaging portion and a tab is defined by the upper end of the box engaging portion above the hook portion. The storage box has a rim at the upper end, the rim having an underside with at least one opening defined therein. The tab of the box engaging portion is disposed in the at least one opening when the combination is in the installed position.

In some embodiments, the adjustable support leg includes a base portion integral with the box engaging portion and an adjustment portion adjustably connected to the base portion. The outer end of the adjustable support leg is defined by an end of the adjustment portion.

In some embodiments, the bracket assembly further includes a box support portion extending from the first side of the box engaging portion. When the combination is in the installed position, the bottom of the storage box base is disposed on the box support portion. In some versions, the base portion of the adjustable support leg and a part of the adjustment portion form the box support portion of the bracket assembly.

In some embodiments, the bracket assembly further includes a box support portion extending from the first side of the box engaging portion, and when the combination is in the installed position, the bottom of the storage box base is disposed on the box support portion. In some versions, the box support portion is integral with the box engaging portion.

In some embodiments, the hook portion has openings for fasteners, and when the combination is in the installed position, fasteners extend through openings into the upper rail of the bed of the truck.

In some embodiments, the hook portion includes a base portion integral with the box engaging portion and an end portion adjustable with respect thereto.

In a further embodiment, the present invention provides a storage box and a supporting bracket assembly for use in the bed of a pickup style truck. The storage box has a sidewall. The bracket has a hook portion extending therefrom and a support leg extending therefrom. The combination has an installed position wherein the hook portion engages the upper rail of a bed of a pickup style bed, the support leg engages a wall extending downwardly from the upper rail of the bed and the storage box is supported on the bracket assembly adjacent the wall of the bed.

BRIEF DESCRIPTION OF THE DRAWINGS

FIG. 4 is a perspective exploded view of an embodiment of a bracket assembly that forms part of the present invention.

DETAILED DESCRIPTION OF THE PREFERRED EMBODIMENTS

The present invention provides a storage box and a bracket assembly for supporting the storage box in the bed of a pickup style truck. The combination of the box and bracket assembly is preferably designed such that the bracket assembly engages an upper rail and side wall of the truck bed and supports the storage box adjacent the wall of the bed and supported above a floor of the bed.

Figure 1:
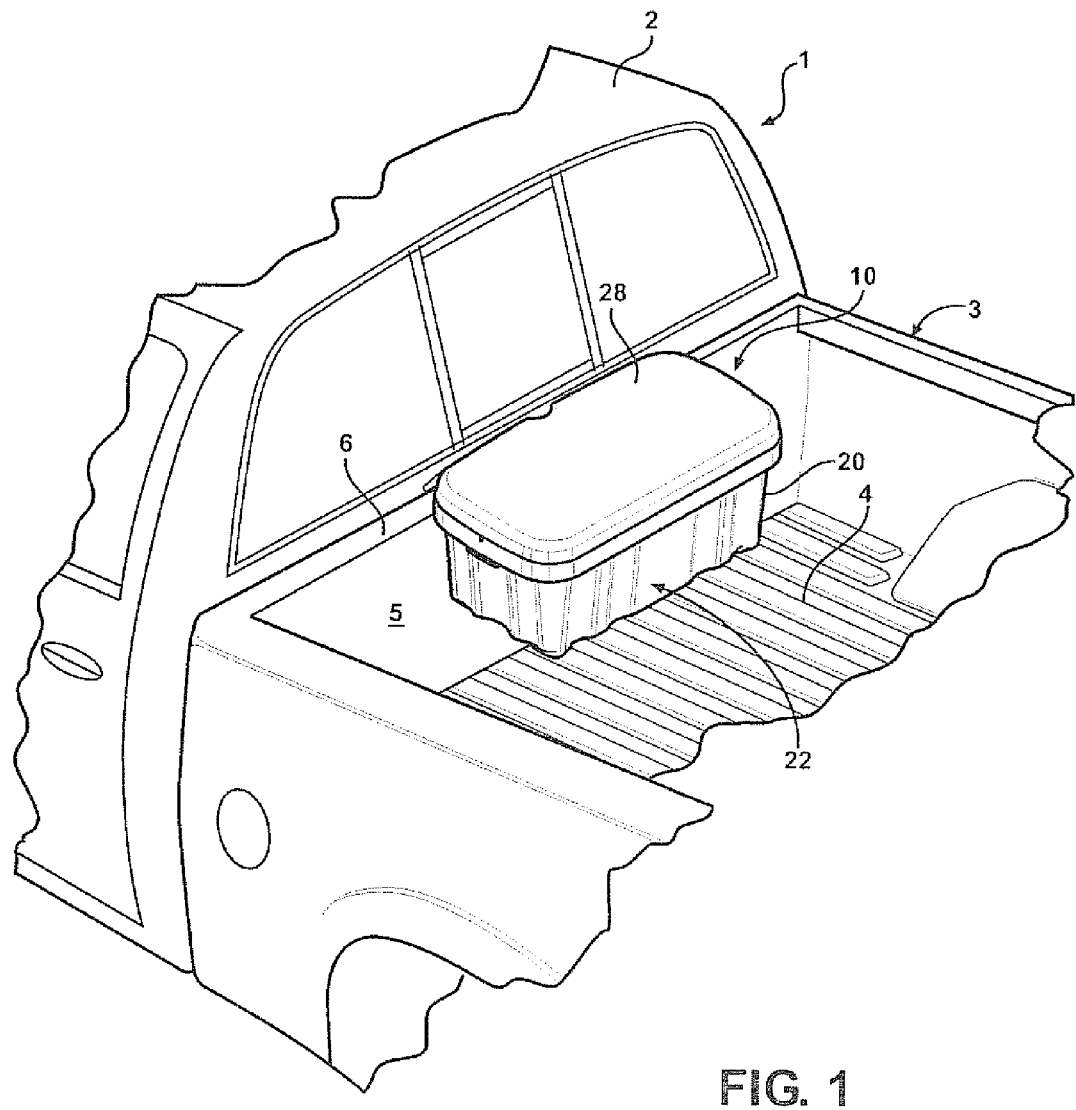
FIG. 1 is a perspective view of a portion of a pickup style truck with an embodiment of a storage box and bracket assembly in an installed position on a front wall of the bed of the truck.

Referring to FIG. 1, a portion of a pickup style truck is generally shown at 1. The truck has a cab portion 2 and a bed 3 that is disposed behind the cab portion 2. The bed has a floor 4 and side walls that extend upwardly from the floor. One of the side walls is a front wall 5 disposed at the front of the bed adjacent the cab portion 2. The upper edge of the bed may be referred to as an upper rail 6. As known to those of skill in the art, it is common to install a bedliner in the bed of such a truck, with the bedliner covering the walls and/or rails of the bed. It should be understood that where a bedliner is used, it is to be considered part of the bed for purposes of the description herein. That is, the wall of the bedliner acts as or as part of the wall of the bed and the portion of the bedliner covering the rail is considered as or as part of the rail.

Figure 2:
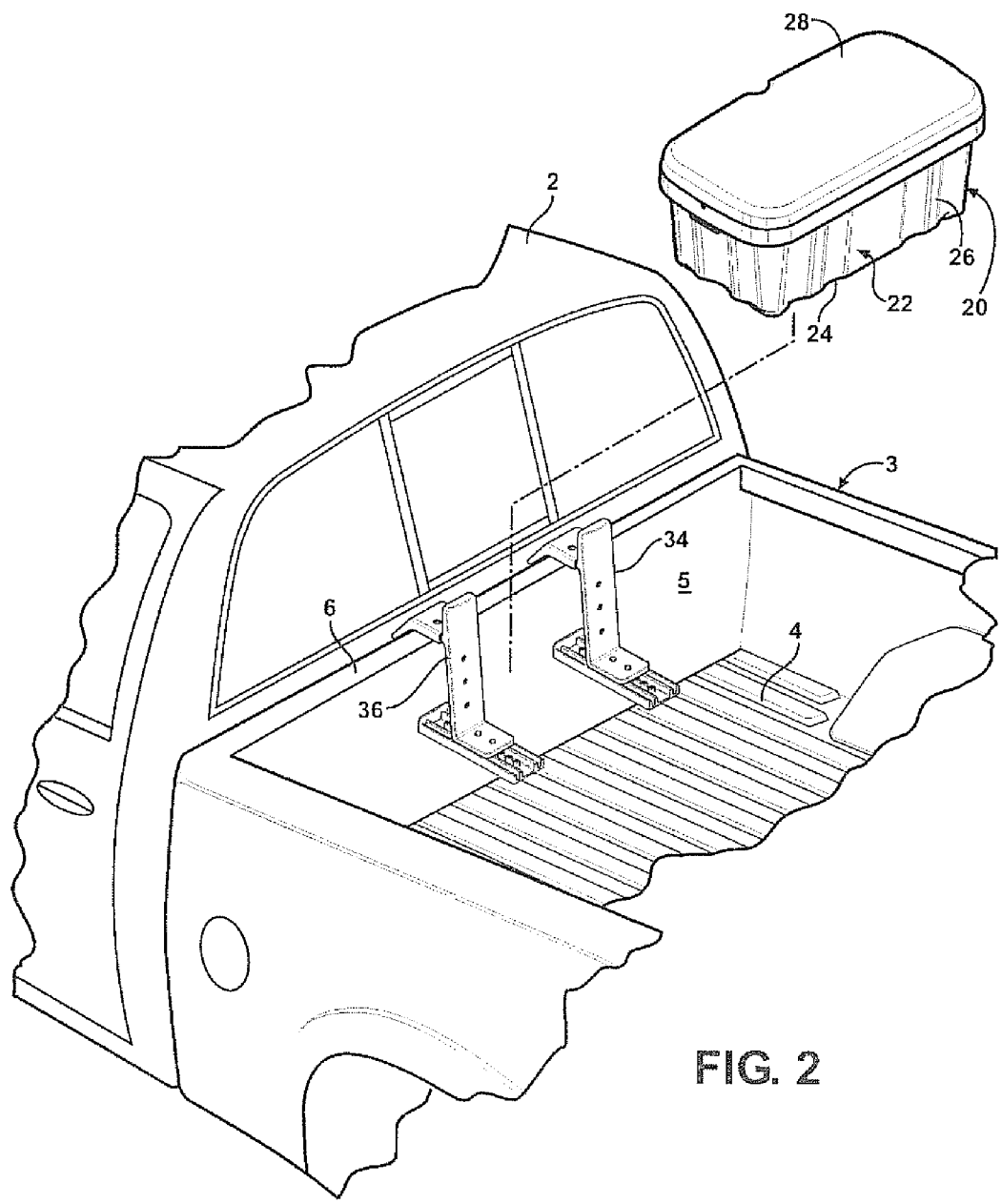
FIG. 2 is a perspective view similar to FIG. 1 with the storage box separated from the bracket assembly.
Figure 3:
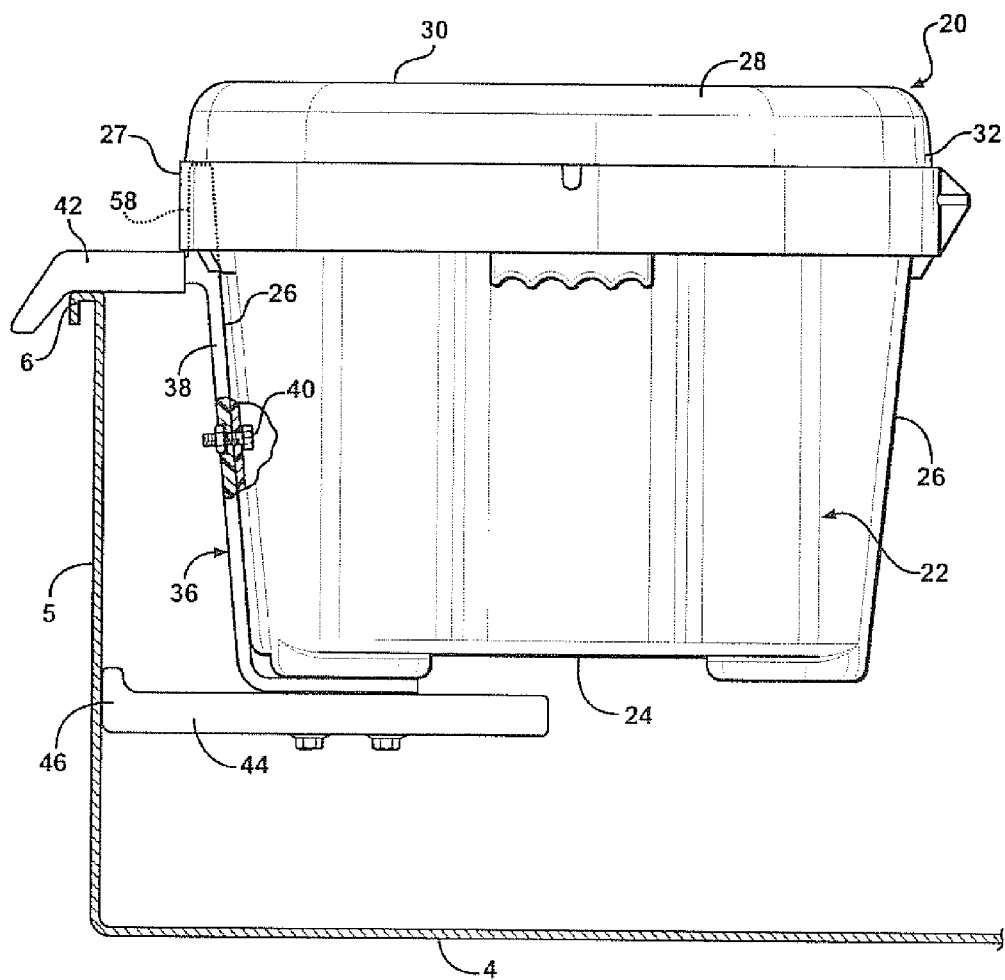
FIG. 3 is a side view of the storage box and bracket assembly of FIGS. 1 and 2, with a portion of the truck bed shown in cross section.

Referring to FIGS. 1 and 2, an embodiment of the present invention, including the combination of a storage box and a bracket assembly, is shown at 10. The combination includes a storage box 20 and one or more bracket assemblies 34 and 36 designed to interconnect the storage box with a wall 5 of a truck bed 3. While the storage box 20 is shown connected to the front wall, it may instead be attached to any of the other side walls of the bed. Referring to FIGS. 1-3, the illustrated embodiment of the storage box 20 has a base 22 with a bottom 24 and a plurality of side walls 26 that extend upwardly from the bottom to an upper edge 27. The box 20 also has a lid 28 with a top 30 and a lower edge 32. The lower edge is configured to fit against the upper edge 27 of the base 22 so as to close the box. As will be clear to those of skill in the art, the storage box 20 may take a variety of forms and may include hinges, locks, multi-section lids, and other features. The box may have a visual appearance dissimilar to the illustrated embodiment. It is also possible to provide a box without a lid.

Referring to FIGS. 2 and 3, the bracket assemblies 34 and 36 are configured to attach to a side wall 26 of the box 20 and to also engage the upper rail 6 and wall 5 of the truck bed so as to support the box 20 adjacent the wall and preferably at a position spaced above the floor 4 of the bed.

Referring to FIG. 3, the bracket assembly 36 is shown in side view. The two bracket assemblies are preferably identical, such that only one will be described in detail. The bracket assembly 36 has a middle portion 38 that may also be referred to as a box engaging portion. The box engaging portion 38 is interconnected with a side wall 26 of the box, such as by using a fastener as illustrated at 40. Alternatively, the box engaging portion may be interconnected with the side wall in other ways such as interlocking tabs, adhesive, or being integrally formed therewith. As shown, a rearward side of the box engaging portion 38 is adjacent the side wall 26 of the box 20. A hook portion 42 of the bracket assembly 36 extends from the forward side of the box engaging portion 38 near or at an upper end of the box engaging portion. The hook portion is configured to pass over the top of the upper rail 6 of the wall 5 of the truck bed. Preferably, it may be attached thereto using fasteners, not illustrated. The bracket assembly 36 also has an adjustable support leg 44 that extends from the forward side of the box engaging portion 38 to an outer end 46. In the installed position, illustrated in FIG. 3, the outer end 46 of the adjustable support leg 44 engages the wall 5 of the truck bed so as to support the box 22 in a level position. By adjusting the position of the outer end 46 relative to the box engaging portion 38, the box 20 may be leveled. As known to those of skill in the art, the shape of the walls of a truck bed varies depending on the make and model. As such, the adjustable support leg 44 may be adjusted depending on the application. For example, a different position will typically be desirable depending on whether the box and bracket assembly are attached to the front wall or one of the other side walls of the truck bed.

As will be clear to those of skill in the art, the exact configuration of the bracket assembly 36 may take a variety of forms. FIG. 4 shows an exploded view of a preferred configuration which is constructed as three pieces. A first piece 50 forms the box engaging portion and has fastener openings defined therein for fasteners to engage with the side wall of the storage box. The piece 50 has an upper end 52 and a lower end 54. A first tab 56 extends forwardly from the box engaging portion near the upper end 52. However, as shown, the upper end 52 extends beyond the tab 56 so as to form an upper tab 58. Referring again to FIG. 3, it can be seen that this upper tab 58 may extend into the underside of the upper edge 27 of the base 22 of the box 20 so as to help interconnect the first piece 50 with the base 22. The upper edge 27 may be considered a rim, and may have a slot or channel provided therein for receiving the tab 58.

Referring again to FIG. 4, the first piece 50 of the bracket assembly further includes a rearwardly extending tab 60 that extends rearwardly from the lower end 54 of the first piece 50. In the illustrated embodiment, the tab 60 and the tab 56 are generally disposed in parallel planes. The box engaging portion of the first piece 50 is generally perpendicular to the tabs 56 and 60, though may be angled somewhat with respect to absolute perpendicular so as to match the sloped side wall 26 of the box, if the side wall is sloped in the particular embodiment.

The bracket assembly illustrated in FIG. 4 further includes a second piece 62. The second piece 62 cooperates with the tab 56 to form the hook portion of the bracket assembly. In some embodiments, the bracket assembly is installed in the truck bed by passing a fastener through the tab 56 into the upper rail 6 and then the second piece 62 forms a cover for the tab 56 and fastener. Alternatively, fasteners may pass through both pieces. Further, the second piece 62 may be adjustable with respect to the tab 56 so as to accommodate a wider range of applications. For example, if the bracket assembly is attached to a side wall of the truck bed, the rail may be wider than shown, and adjustability will be beneficial. As yet a further alternative, the entire hook portion may be formed integrally with the first piece 50 rather than being formed as two pieces.

The embodiment of the bracket assembly illustrated in FIG. 4 further includes a third piece which forms the adjustable support leg of the bracket assembly. As shown, the third piece is an elongated piece that attaches to the underside of the tab 60 using fasteners which may engage a variety of receiving holes in the piece 64. The forward end 66 of the third piece 64 forms the outer end of the support leg for engaging the wall of the truck bed. As shown, the third piece 64 may have longitudinal ridges on an upper surface thereof and the tab 60 may have corresponding downwardly extending ridges on its lower surface so as to securely engage with one another. As will be clear to those of skill in the art, the third piece 64 may be configured differently than illustrated. As one example, if the box engaging portion of the bracket assembly is integral with the box, the third piece 64 may interconnect with a lower surface of the box. Further, a slot or other engaging feature may be molded into the lower end of the first piece 50 or into the box itself for receiving the adjustable support leg. The adjustability of the support leg may be achieved with the fasteners, as illustrated, or in other ways such as a ratcheting mechanism, with an interconnection feature such as locking tabs, or in other ways. While FIG.

Figure 5:
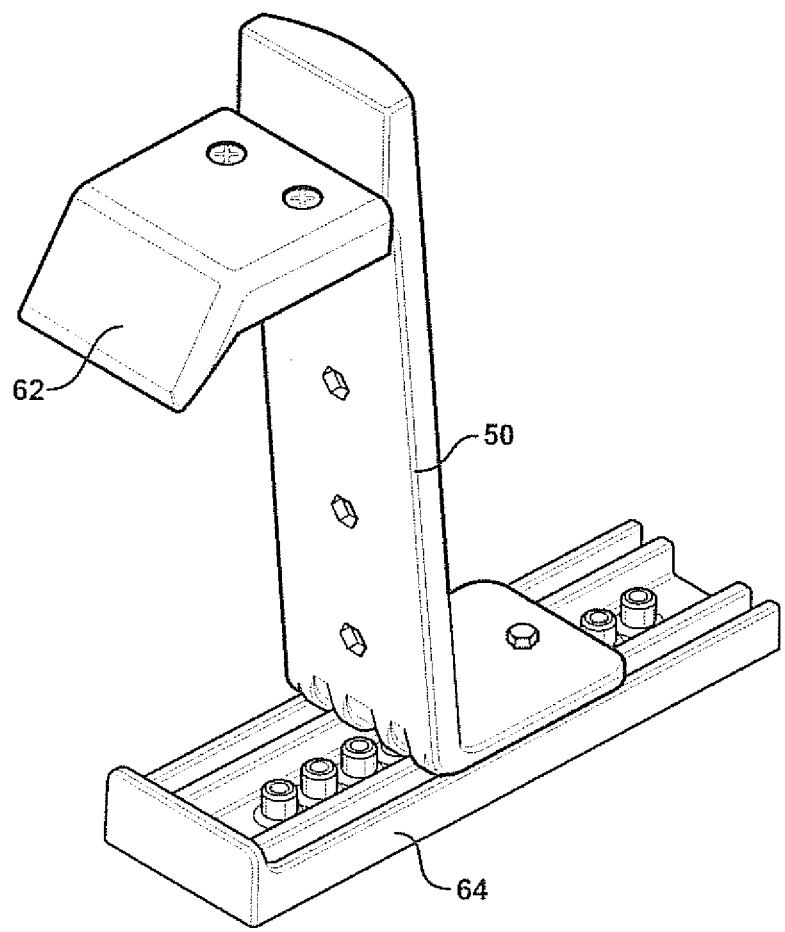
FIG. 5 is a perspective view of the bracket assembly of FIG. 4 with the pieces assembled.

4 illustrates the fasteners passing through the tab 60 into the third piece 64, alternatively the fasteners may pass from the underside of the piece 64 through the tab 60 and into the bottom of the box for further interconnecting the box and bracket assembly. FIG. 5 provides a perspective view of the pieces 50, 62 and 64 of the bracket assembly interconnected in a use configuration. In some embodiments, the tab 60 and/or part of the third piece 64 also serve as a box support portion with the bottom of the box resting thereon.

As will be clear to those of skill in the art, the illustrated combination may also be assembled such that the box is positioned higher with respect to the bracket assembly. For example, if the box is positioned adjacent a side wall of the truck, above a wheel well, the wheel well may prevent the box from being positioned as low as illustrated. In this case, the box may be positioned higher than illustrated, with respect to the bracket assembly. The box engaging portion may be attached to the side of the box, but the upper end of tab of the box engaging portion may not enter the opening under the rim of the box and/or the bottom of the box may not rest on the box support portion.

As will be clear to those of skill in the art, the herein described embodiments of the present invention may be altered in various ways without departing from the scope or teaching of the present invention. It is the following claims, including all equivalents, which define the scope of the present invention.

The invention claimed is:

1. In combination, a storage box and a bracket assembly for supporting the storage box in the bed of a pickup style truck having an upper rail and a side wall extending downwardly from the upper rail, the combination comprising:
   a storage box comprising:
      a base having a bottom and a plurality of side walls extending upwardly from the bottom to an upper edge; and
      a lid having a top and a lower edge configured to fit against the upper edge of the base; and
   a bracket assembly comprising:
      a box engaging portion having an upper end and a lower end, the box engaging portion further having a first side and a second side, the box engaging portion being connectable to a side wall of the storage box base such that the first side is disposed towards the side wall of the storage box;
      a hook portion extending from the second side of the box engaging portion, the hook portion configured to engage the upper rail of a bed of a pickup style truck; and
      an adjustable support leg extending from the second side of the box engaging portion, the adjustable support leg including a base portion integral with the box engaging portion and an adjustment portion adjustably connected to the base portion, the adjustable portion having an outer end, the adjustable support leg being adjustable so as to adjust the distance between the outer end and the box engaging portion;
      a box support portion extending from the first side of the box engaging portion, the base portion of the adjustable support leg and a part of the adjustment portion forming the box support portion of the bracket assembly, the bottom of the storage box base being disposed on the box support portion;
      the combination having an installed position wherein the hook portion engages the upper rail of a bed of a pickup style bed, the outer end of the adjustable support leg engages a wall extending downwardly from the upper rail of the bed and the storage box is supported on the bracket assembly adjacent the wall of the bed.

2. The combination of claim 1, wherein:
the storage box has a rim at the upper edge of the base, the rim having an underside with at least one opening defined therein; and
the upper end of the box engaging portion being disposed in the at least one opening when the combination is in the installed position.

3. The combination of claim 1, further comprising:
a second bracket assembly comprising:
   a box engaging portion having an upper end and a lower end, the box engaging portion further having a first side and a second side, the box engaging portion being connectable to a side wall of the storage box base such that the first side is disposed towards the side wall of the storage box;
   a hook portion extending from the second side of the box engaging portion, the hook portion configured to engage the upper rail of a bed of a pickup style bed; and
   an adjustable support leg extending from the second side of the box engaging portion, the adjustable support leg having an outer end, the adjustable support leg being adjustable so as to adjust the distance between the outer end and the box engaging portion;
wherein when the combination is in the installed position, the hook portion of the second bracket assembly engages the upper rail of a bed of a pickup style bed, the outer end of the adjustable support leg of the second bracket assembly engages a wall extending downwardly from the upper rail of the bed and the storage box is supported on the second bracket assembly adjacent the wall of the bed.

4. The combination of claim 1, wherein:
the hook portion extends from the box engaging portion near the upper end of the box engaging portion.

5. The combination of claim 4, wherein:
the hook portion is spaced from the upper end of the box engaging portion, a tab being defined by the upper end of the box engaging portion above the hook portion;
the storage box has a rim at the upper edge of the base, the rim having an underside with at least one opening defined therein; and
the tab of the box engaging portion is disposed in the at least one opening when the combination is in the installed position.

6. The combination of claim 1, wherein:
the box support portion is integral with the box engaging portion.

7. The combination of claim 1, wherein:
the hook portion has openings for fasteners;
wherein when the combination is in the installed position, fasteners extend through openings into the upper rail of the bed of the truck.

8. The combination of claim 1, wherein:
the hook portion includes a base portion integral with the box engaging portion and an end portion adjustable with respect thereto.

* * * * *